(12) United States Patent
Peled

(10) Patent No.: US 9,016,982 B2
(45) Date of Patent: Apr. 28, 2015

(54) CANAL WATER REFILL SYSTEM

(71) Applicant: Dan Peled, Herzliya (IL)

(72) Inventor: Dan Peled, Herzliya (IL)

( * ) Notice: Subject to any disclaimer, the term of this patent is extended or adjusted under 35 U.S.C. 154(b) by 22 days.

(21) Appl. No.: 13/902,875

(22) Filed: May 27, 2013

(65) Prior Publication Data

US 2013/0322968 A1 Dec. 5, 2013

Related U.S. Application Data

(60) Provisional application No. 61/652,876, filed on May 30, 2012.

(51) Int. Cl.
E02B 5/08 (2006.01)
E02C 1/06 (2006.01)
E02B 5/06 (2006.01)

(52) U.S. Cl.
CPC ... *E02B 5/08* (2013.01); *E02C 1/06* (2013.01); *E02B 5/06* (2013.01)

(58) Field of Classification Search
CPC ............. E02B 5/06; E02B 5/08; E02C 1/06
USPC ............ 405/80, 84, 85, 86, 87; 137/132, 134, 137/142, 205, 255, 256, 265, 565.23, 571, 137/575; 415/6
See application file for complete search history.

(56) References Cited

U.S. PATENT DOCUMENTS

| 4,339,232 A * | 7/1982 | Campbell ................. 417/54 |
| 2008/0038062 A1 | 2/2008 | Allonca |
| 2010/0260549 A1 | 10/2010 | Shelton |

* cited by examiner

Primary Examiner — Sunil Singh
Assistant Examiner — Carib Oquendo
(74) Attorney, Agent, or Firm — Eitan, Mehulal & Sadot

(57) ABSTRACT

A system for recirculating lock water includes a sealable storage area located near a lock for receiving water from the lock. The storage area is large enough to house the lock water with excess space between a maximum water level and the ceiling. The system also includes at least one compressor connected to the storage area to create a vacuum to withdraw the water from the lock into the storage area.

7 Claims, 5 Drawing Sheets

CANAL WATER REFILL SYSTEM

CROSS-REFERENCE TO RELATED APPLICATIONS

This application claims priority from U.S. Provisional Patent Application No. 61/652,876, filed May 30, 2012, which is hereby incorporated in its entirety by reference.

FIELD OF THE INVENTION

The present invention relates to canal locks.

BACKGROUND OF THE INVENTION

Locks are known in the art as a system for raising and lowering levels of water between stretches of water of different levels on river and canal waterways in order to compensate for changes in geography such as steep inclines and mountains or to bypass obstructions such as weirs and rapids in order to make the water more navigable for boats.

The Panama Canal, completed in 1914, makes it possible for large ships to easily sail from the Atlantic Ocean to the Pacific Ocean. The Panama Canal consists of three sets of locks which are fed with water from various artificial lakes that have been created for this purpose.

SUMMARY OF THE PRESENT INVENTION

There is provided in accordance with a preferred embodiment of the present invention, a system for recirculating lock water. The system includes a sealable storage area located near a lock for receiving water from the lock. The storage area is large enough to house the lock water with excess space between a maximum water level and the ceiling. The system also includes at least one compressor connected to the storage area to create a vacuum to withdraw the water from the lock into the storage area.

Moreover, in accordance with a preferred embodiment of the present invention, the system includes valves to seal the storage area and to allow the flow of the water from the lock to the storage area and from the storage area to the lock, a sensor to monitor the water level and a processor to control the at least one compressor and the valves according to the amount and timing of the water required.

Moreover, in accordance with a preferred embodiment of the present invention, the base of the storage area is positioned above or level with the lock.

Further, in accordance with a preferred embodiment of the present invention, the at least one compressor is a jet engine.

There is provided in accordance with a preferred embodiment of the present invention, a system, a method for recirculating lock water. The method includes withdrawing at least a portion of the lock water from a lock into a sealable storage area located near the lock via a vacuum. The storage area is large enough to house the lock water with excess space between a maximum water level and the ceiling. The method also includes storing the water in the storage area and releasing the water from the storage area into the lock.

Moreover, in accordance with a preferred embodiment of the present invention, the withdrawing includes compressing air using at least one compressor.

Further, in accordance with a preferred embodiment of the present invention, the withdrawing also includes monitoring the water level using a sensor.

Still further, in accordance with a preferred embodiment of the present invention, the compressing includes using at least one jet engine.

Additionally, in accordance with a preferred embodiment of the present invention, the storing includes sealing the storage area using valves to contain the water within the storage area.

Moreover, in accordance with a preferred embodiment of the present invention, the releasing includes opening a valve to allow the water to flow according to gravity from the storage area to the lock.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
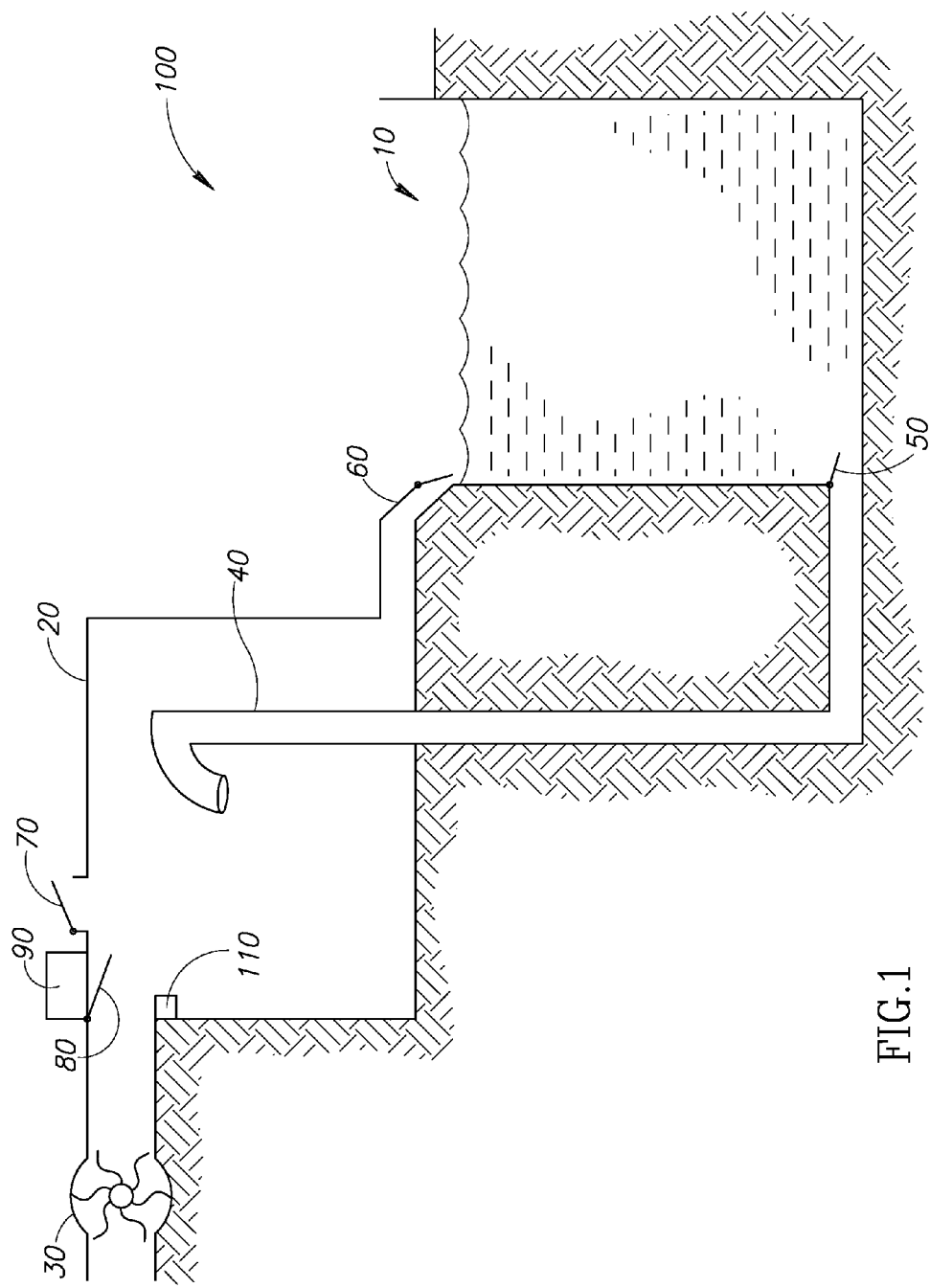
FIGS. 1, 2, 3 and 4 are schematic illustrations of a canal water refill system constructed and operative in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the Panama Canal can only operate with a continuous, constant supply of water all year long in order to service its three sets of locks. All three sets of locks are paired with two chambers, which in principle; allow ships to pass in opposite directions simultaneously. However, large ships cannot cross safely at speed, so in practice ships often pass in one direction for a time, then in the other, using both "lanes" of the lock.

Applicant has further realized that the amount of water available and stored in artificial lakes and reservoirs will not always be able to cope with the volume of traffic wishing to sail between the two oceans. Two out of the three locks release their water out into the ocean and then refill from the nearest volume of water. Each chamber of each lock requires approximately 101,000 m$^3$ to fill it.

Applicant has also realized that this vast amount water required to fill the lock could potentially be recirculated if it was to be held in a suitable storage area once drained from the lock instead of being discharged into the ocean. Current lock water recirculation systems such as that disclosed in US Publication 2008-0038062, are typically located underground and may rely on pumps to transfer water from the cisterns into the lock. Other systems such as US 2010-0260549 disclose systems that use over ground open cisterns or reservoirs which lose a large percentage of the water stored to evaporation, particularly in hot countries. Applicant has further realized that, by storing the water in a sealed storage area, such as a sealed cistern, water may be moved relatively quickly to the storage area from the lock by the creation of a vacuum and from the storage area to the lock by the release of the vacuum, relying on gravity only. Storing water in a sealed storage area also prevents loss of water through evaporation.

Reference is now made to FIGS. 1, 2, 3 and 4 which illustrate a system 100 for recirculating lock water, constructed and operative in accordance with a preferred embodiment of the present invention. System 100 comprises a lock 10, a closed storage area 20, a compressor 30 and a pipe 40. Storage area 20 may comprise a valve 50 to allow water to enter from lock 10, a valve 60 to allow for water to flow into lock 10, an atmosphere valve 70 on the ceiling which opens to the atmosphere and a compressor valve 80 situated between storage area 20 and compressor 30. Storage area 20 may also comprise a processor 90 and a sensor 110. In accordance with a preferred embodiment of the present invention, compressor 30, which may be attached to the ceiling or upper part of storage area 20, may comprise one or more jet engines. Jet engines are known in the art to also act as compressors. When activated, compressor 30 may be used to draw air out of sealed storage area 20 in order to create a vacuum. It will also be appreciated that when sealed, storage area 20 may be able to accommodate the 101,000 m³ of water that is required to fill lock 10 to maximum capacity.

Figure 5:
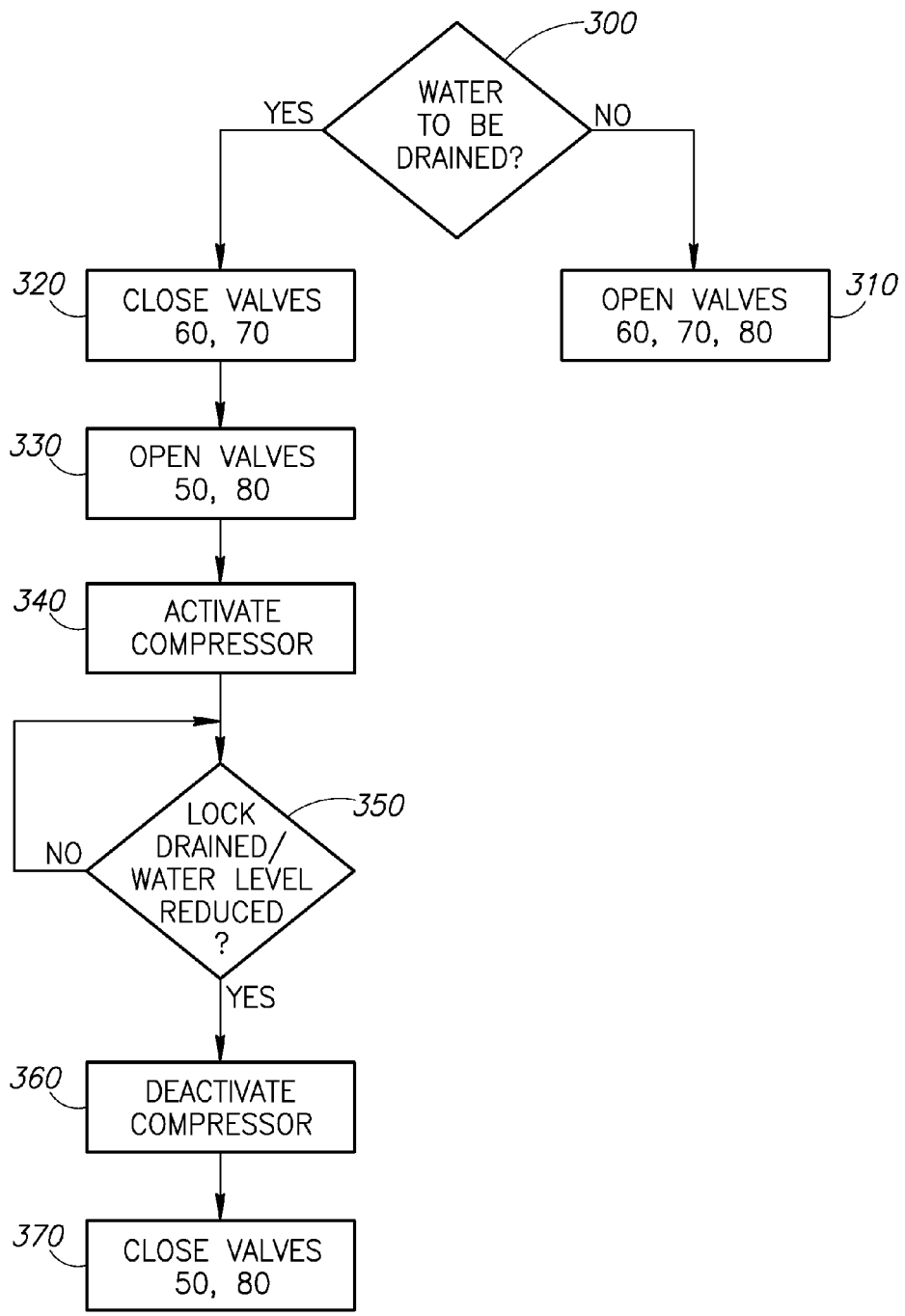
FIG. 5 is a flow chart of the processes involved in operating the system of FIGS. 1, 2, 3 and 4, system constructed and operative in accordance with the present invention.

Reference is also made to FIG. 5 which illustrates a flowchart of the processes described herein below.

FIG. 1 shows a snapshot of system 100 when lock 10 is full of water and storage area 20 is empty (step 300). It will be appreciated that in this state, compressor 30 may be inactive, and all valves 50, 60, 70 and 80 may be open.

Figure 2:
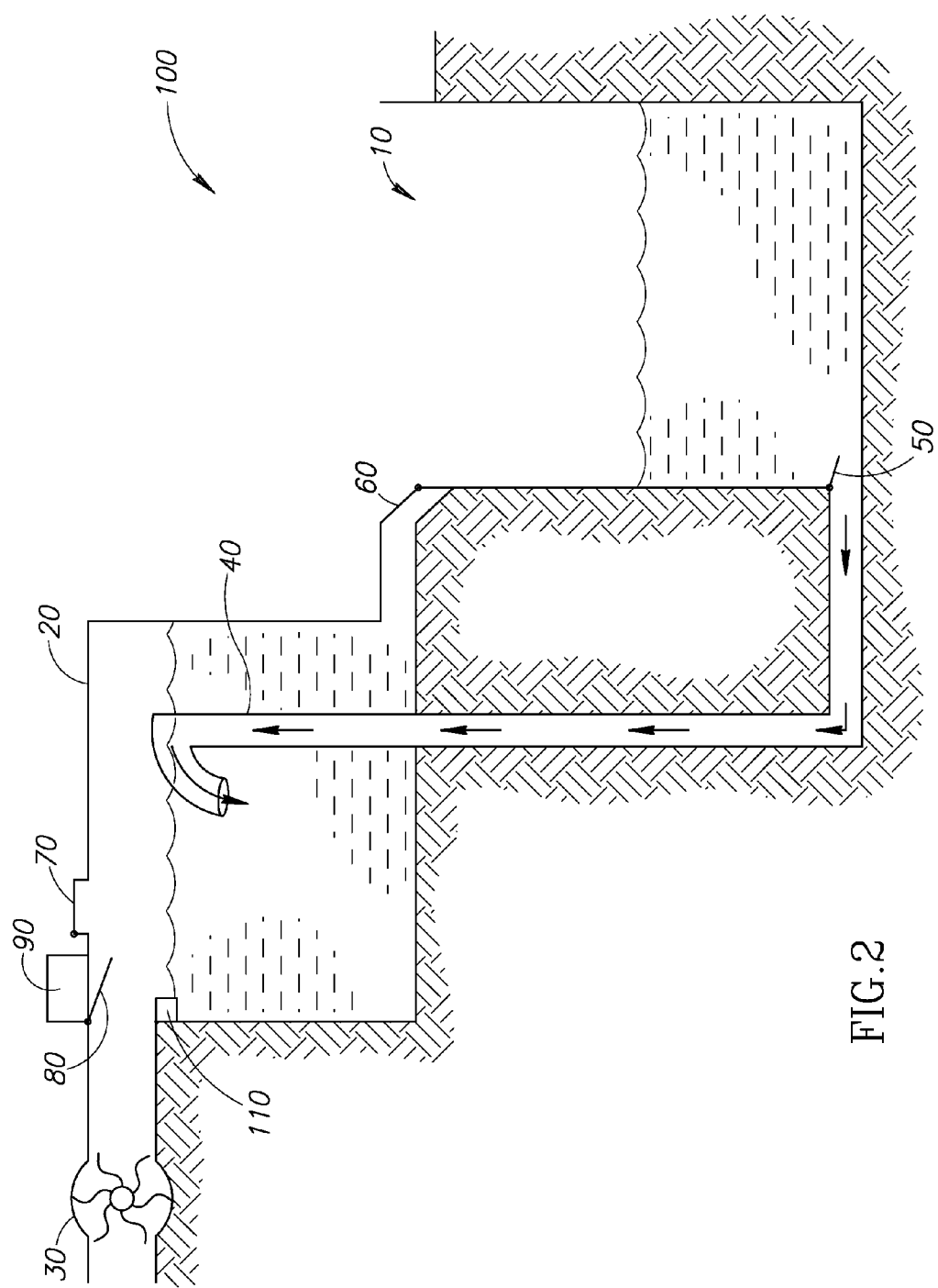

FIG. 2 illustrates lock 10 being drained of water. It will be appreciated that when valves 60 and 70 are closed (step 320), valves 50 and 80 are opened (step 330) and compressor 30 is activated (step 340), a vacuum may be created within storage area 20. It will be appreciated that if a vacuum is present and valve 50 is open, the outer atmospheric pressure from lock 10 may push against the vacuum due to the change is pressure and water may be pushed into storage area 20 through opening 50 via pipe 40 as illustrated by the arrows in FIG. 2.

Figure 3:
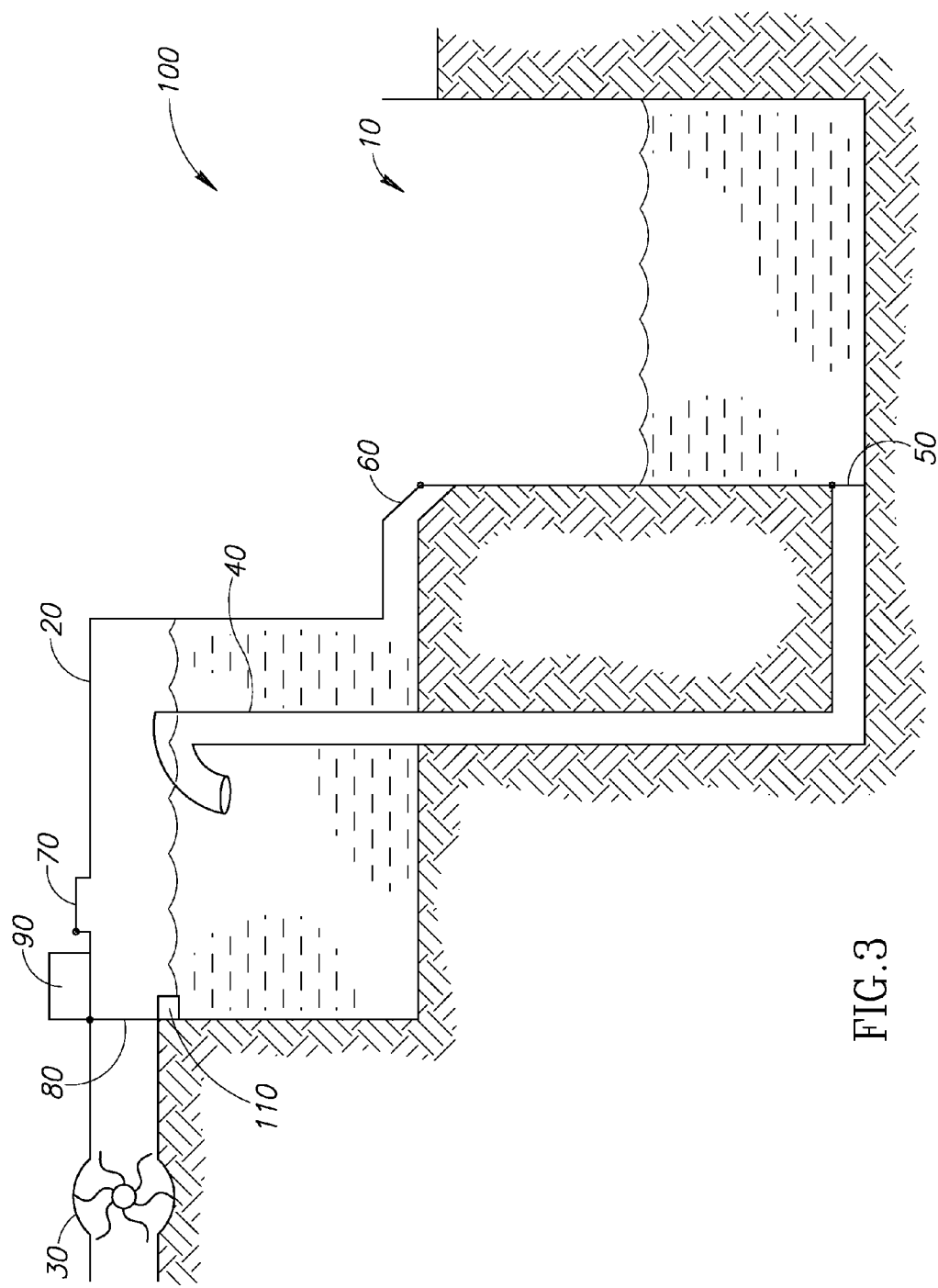

Once the water level has been sufficiently lowered in lock 10, compressor 30 may be shut down and valves 50, 60 and 80 may be closed, thus sealing storage area 20 and containing the water. At this point, lock 10 may be in its drained state as illustrated in FIG. 3 and storage area 20 may store the water that may be recirculated into lock 10 when required.

It will be appreciated that although storage area may be custom built to hold the correct amount of water, a sensor 110 may be implemented near the top of storage area 20 to ensure that excess water is not drawn into storage area 20 which may reach and be potentially damaging to compressor 30. It will be appreciated that when sensor 110 senses that storage area is full to capacity (step 350), it may inform processor 90 which in turn may instruct compressor 30 to stop (step 360), and may close valves 50 and 80 (step 370) in order to contain the water within storage area 20. It will be appreciated compressor 30 may take time to come to a complete halt, therefore sensor 110 may be positioned accordingly to ensure there is enough time for compressor 30 to stop and for water to stop flowing into storage area 20 from lock 10. It will further be appreciated that if the amount of water from lock 10 does not reach sensor 110, compressor 30 may be deactivated and valves 50 and 80 may be closed using a pre-implemented system.

Figure 4:
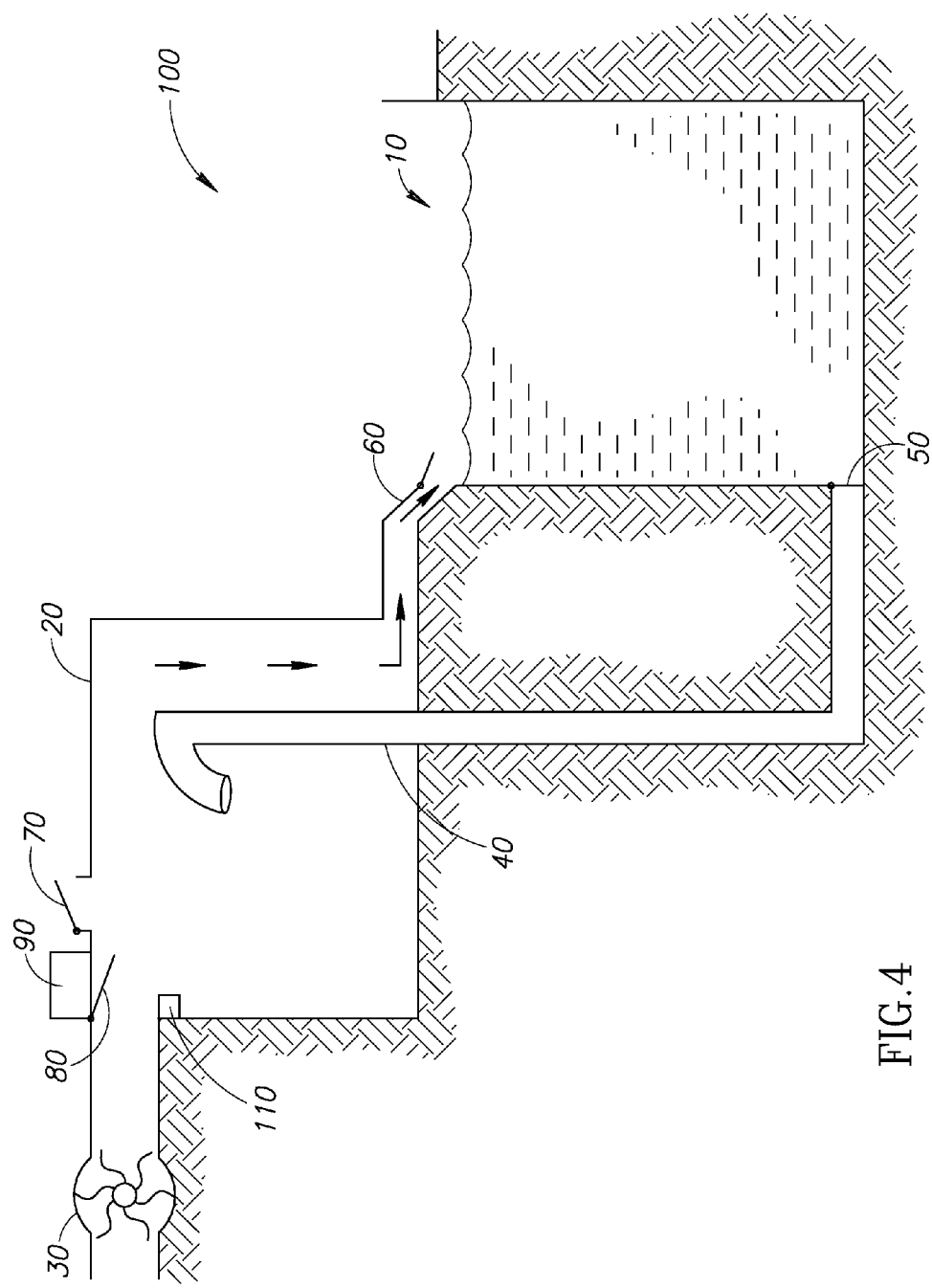

FIG. 4 illustrates the flow of water from storage area 20 back into lock 10. It will be appreciated that when valves 60, 70 and 80 are open (step 310), water that is stored in storage area 20 may flow directly into lock 10 as shown by the arrows due to the change in gravity. It will be further appreciated that since water pressure increases with depth, opening 60 should be located near the bottom of storage area 20 for faster flow.

It will also be further appreciated that the amount of water drained from storage area 20 to fill lock 10 or drained from lock 10 and stored in storage area 20 may vary according to the size of the vessel situated in lock 10. The correct amount of water to be drained or added may be calculated according to a pre-implemented system. As described hereinabove, this system may be incorporated in conjunction with processor 90 to control compressor 30 and valves 50, 60, 70 and 80 accordingly. It will also be appreciated that in the same way system 100 may be automated to drain and refill the lock at set intervals in conjunction with processor 90.

It will be further appreciated the storage area 20 may be located in close proximity to the lock in question and may be slightly raised from the level of the lock in order to allow for the easy flow of water back into the lock as described hereinabove.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for recirculating lock water, the system comprising:
    a sealable storage area located near a lock for receiving water of said lock,
    wherein said storage area is large enough to house said lock water with excess space between a maximum water level and the ceiling of said storage area; and
    at least one jet engine connected to said storage area to create a vacuum to withdraw said water from said lock into said storage area.

2. The system according to claim 1 and also comprising:
    valves to seal said storage area and to allow the flow of said water from said lock to said storage area and from said storage area to said lock;
    a sensor to monitor said water level; and
    a processor to control said at least one jet engine and said valves according to amount and timing of said water required.

3. The system according to claim 1 and wherein base of said storage area is positioned above or level with said lock.

4. A method for recirculating lock water, the system comprising:
    withdrawing at least a portion of said lock water from a lock into a sealable storage area located near said lock via a vacuum, wherein said withdrawing comprises compressing air using at least one jet engine and wherein said storage area is large enough to house said lock water with excess space between a maximum water level and the ceiling of said storage area;
    storing said water in said storage area; and
    releasing said water from said storage area into said lock.

5. The method according to claim 4 wherein said withdrawing comprises monitoring said water level using a sensor.

6. The method according to claim 4 and wherein said storing comprises sealing said storage area using valves to contain said water within said storage area.

7. The method according to claim 4 and wherein said releasing comprises opening a valve to allow said water to flow according to gravity from said storage area to said lock.

* * * * *